: US 9,380,673 B2
(45) Date of Patent: Jun. 28, 2016

(54) LED BACKLIGHT SOURCE AND LIQUID CRYSTAL DISPLAY DEVICE

(71) Applicant: Shenzhen China Star Optoelectronics Technology Co., Ltd., Shenzhen, Guangdong (CN)

(72) Inventor: Hua Zhang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 414 days.

(21) Appl. No.: 14/000,228

(22) PCT Filed: Jun. 25, 2013

(86) PCT No.: PCT/CN2013/077900
§ 371 (c)(1),
(2) Date: Aug. 19, 2013

(87) PCT Pub. No.: WO2014/172986
PCT Pub. Date: Oct. 30, 2014

(65) Prior Publication Data
US 2014/0320786 A1    Oct. 30, 2014

(30) Foreign Application Priority Data

Apr. 24, 2013 (CN) .......................... 2013 1 0145099

(51) Int. Cl.
*H05B 37/02* (2006.01)
*H05B 33/08* (2006.01)
*G09G 3/34* (2006.01)

(52) U.S. Cl.
CPC .......... *H05B 33/0887* (2013.01); *G09G 3/3406* (2013.01); *H05B 33/0815* (2013.01); *H05B 33/0827* (2013.01); *H05B 37/02* (2013.01); *Y02B 20/341* (2013.01); *Y02B 20/347* (2013.01)

(58) Field of Classification Search
CPC ....... H05B 33/08; H05B 37/02; G09G 3/3406
USPC ................... 315/291, 307, 308, 312; 345/102
See application file for complete search history.

(56) References Cited

U.S. PATENT DOCUMENTS

| 2008/0164828 | A1* | 7/2008 | Szczeszynski | ............ G05F 1/46 315/300 |
| 2009/0289559 | A1* | 11/2009 | Tanaka | ............... H05B 33/0827 315/185 R |
| 2011/0062872 | A1* | 3/2011 | Jin | ..................... H05B 33/0818 315/122 |
| 2011/0181625 | A1* | 7/2011 | Shin | ................... H05B 33/0851 345/690 |
| 2013/0140990 | A1* | 6/2013 | Campos | ............. H05B 33/0893 315/120 |
| 2014/0160609 | A1* | 6/2014 | Chen | ........................ H02H 3/20 361/86 |

FOREIGN PATENT DOCUMENTS

CN         102622986 A     8/2012

* cited by examiner

*Primary Examiner* — Tung X Le
(74) *Attorney, Agent, or Firm* — Andrew C. Cheng

(57) ABSTRACT

The present invention provides LED backlight source of liquid crystal display device. The LED backlight source includes: a boost converter, boosting input DC voltage and outputting boosted DC voltage; a plurality of LED strings connected in parallel, with each LED string including a plurality of LEDs in series and receiving boosted DC voltage from boost converter; a plurality of constant-current drivers, controlling current of each LED string, each constant-current driver controlling at least an LED string and first constant-current driver controlling connection/disconnection of boost converter; an under-voltage protection control circuit, outputting under-voltage protection voltage to constant-current drivers and constant-current drivers determining whether to stop operating based on received under-voltage protection voltage, wherein under-voltage protection voltage outputted to first constant-current driver less than under-voltage protection voltages outputted to other constant-current drivers. The LED backlight source can turn on and off LED strings simultaneously to improve the optical quality.

16 Claims, 3 Drawing Sheets

LED BACKLIGHT SOURCE AND LIQUID CRYSTAL DISPLAY DEVICE

BACKGROUND OF THE INVENTION

1. Field of the Invention

The present invention relates to the field of liquid crystal displaying techniques, and in particular to an LED backlight source and liquid crystal display device.

2. The Related Arts

As the technology continuously progresses, the development of backlight technology of liquid crystal display device also continuously grows. The conventional backlight technology of liquid crystal display device uses cold cathode fluorescent lamp (CCFL). But as CCFL backlight has the disadvantages of poor color recovery, low light-emitting efficiency, high discharge voltage, poor discharge characteristics at low temperature, long time to reach stable grayscale, and so on, the backlight technology employing LED has been developed.

In liquid crystal display device, the LED backlight source and the liquid crystal display panel are disposed oppositely face-to-face so that the LED backlight source provides light source to the liquid crystal display panel, wherein the LED backlight source comprises a plurality of LED strings, with each LED string comprising a plurality of LEDs strung in series.

When the LED backlight source needs more LED strings to provide the backlight of high luminance, a plurality of constant-current drivers are connected in parallel to provide sufficient number of connection channels for more LED strings.

FIG. 1 is a schematic view showing a direct LED backlight source of a known technology used in liquid crystal display devices. As shown in FIG. 1, the backlight driver includes a boost converter 110, a plurality of LED strings 120 and a plurality of constant-current drivers 130.

The first constant-current driver 131 controls the connection or disconnection of the boost converter 110 to make the boost converter 110 boost the input DC voltage Vin and output boosted DC voltage to the plurality of LED strings 120. In addition, the input DC voltage Vin, after divided by the resistors R1, R2 and R3, is connected each constant-current driver. When the input DC voltage is too low (for example, a large-power appliance is connected to the power supply loop or a low input DC voltage caused by high power consumption during peak time) so that the voltage over the resistor R3 is not greater than an under-voltage protection trigger voltage, the constant-current driver will cut off the power supply, leading to shutting down the connected LED strings.

In actual application, the constant-current driver is often integrated onto a chip. Because of the manufacturing process, the under-voltage protection trigger voltage of each integrated circuit chip is not completely identical and a small variation exists. Therefore, when the input DC voltage is too low, the voltage over the resistor R3 is just about triggering the under-current protection function of a constant-current driver, and the voltage over the resistor R3 at this point is not necessarily larger than the under-voltage protection trigger voltages of other constant-current drivers, as a result, some LED strings of the plurality of LED strings 120 connected in parallel will shut down (i.e., OFF) while others still function normally (i.e., ON). As such, the optical quality of the LED backlight source suffers a negative impact. Also, when the input DC voltage Vin changes from low to high, the plurality of LED strings 120 connected in parallel will display the aforementioned incoherent behavior.

SUMMARY OF THE INVENTION

The technical issue to be addressed by the present invention is to provide liquid crystal display device, which provides enhanced performance of displaying of the liquid crystal display device through improving y characteristic of the liquid crystal display device so as to enhance the quality of displaying.

To address the above issues in known technologies, the present invention provides an LED backlight source of liquid crystal display device, which comprises: a boost converter, for boosting the input DC voltage and outputting boosted DC voltage; a plurality of LED strings connected in parallel, wherein each LED string comprising a plurality of LEDs strung in series and receiving the boosted DC voltage from the boost converter; a plurality of constant-current drivers, for controlling the size of the current of each of the plurality of LED strings, wherein each constant-current driver controlling the size of the current of at least an LED string and the first constant-current driver controlling the connection/disconnection of the boost converter; an under-voltage protection control circuit, for outputting under-voltage protection voltage to each of the constant-current drivers and each of the constant-current drivers determining whether to stop operating based on received under-voltage protection voltage, wherein the under-voltage protection voltage outputted to the first constant-current driver being less than the under-voltage protection voltages outputted to the constant-current drivers other than the first constant-current driver of the plurality of constant-current drivers.

The present invention provides a liquid crystal display device, which comprises: an LED backlight source and a liquid crystal display panel disposed opposite to the LED backlight source, the LED backlight source providing display light source to the liquid crystal display panel for the liquid crystal panel to display images, wherein the LED backlight source further comprising: a boost converter, for boosting the input DC voltage and outputting boosted DC voltage; a plurality of LED strings connected in parallel, wherein each LED string comprising a plurality of LEDs strung in series and receiving the boosted DC voltage from the boost converter; a plurality of constant-current drivers, for controlling the size of the current of each of the plurality of LED strings, wherein each constant-current driver controlling the size of the current of at least an LED string and the first constant-current driver controlling the connection/disconnection of the boost converter; an under-voltage protection control circuit, for outputting under-voltage protection voltage to each of the constant-current drivers and each of the constant-current drivers determining whether to stop operating based on received under-voltage protection voltage, wherein the under-voltage protection voltage outputted to the first constant-current driver being less than the under-voltage protection voltages outputted to the constant-current drivers other than the first constant-current driver of the plurality of constant-current drivers.

According to a preferred embodiment of the present invention, in each of the plurality of LED strings, the plurality of LEDs strung in series is further connected to a fourth resistor in series.

According to a preferred embodiment of the present invention, the constant-current driver comprises: a control module, for determining whether to stop operating based on the received under-voltage protection voltage outputted by the under-voltage protection control circuit, wherein the control module of the first constant-current driver further controlling the connection/disconnection of the boost converter; and a detection module, for detecting the voltage over the two ends of the fourth resistor connected in series with any LED string of the plurality of LED strings controlled by the constant-current driver, and controlling the current of any LED string of the plurality of LED strings based on the feedback of the voltage over the two ends of the fourth resistor.

According to a preferred embodiment of the present invention, the under-voltage protection control circuit comprises: a first resistor, a second resistor, a step-down unit and a third resistor, wherein one end of the first resistor for receiving input DC voltage and the other end connected to one end of the second resistor; the other end of the second resistor connected to one end of the step-down unit and connected respectively to the control modules of the constant-current drivers other than the first constant-current driver of the plurality of constant-current drivers; the other end of the step-down unit connected to one end of the third resistor and connected to the control module of the first constant-current driver of the plurality of constant-current drivers; and the other end of the third resistor being grounded.

According to a preferred embodiment of the present invention, the step-down unit is a first crystal diode, the one end of the step-down unit is the positive terminal of the first crystal diode, and the other end of the step-down unit is the negative terminal of the first crystal diode.

According to a preferred embodiment of the present invention, the boost converter comprises: an inductor, a MOS transistor, a second crystal diode and a capacitor, wherein one end of the inductor for receiving input DC voltage, and the other end connected to the positive terminal of the second crystal diode; the negative terminal of the second crystal diode connected to the positive terminals of each of the plurality of LED strings; the drain of the MOS transistor connected to the positive terminal of the second crystal diode, the source of the MOS transistor being ground, the gate of the MOS transistor connected to the control module of the first constant-current driver of the plurality of the constant-current drivers; one end of the capacitor connected to the negative terminal of the second crystal diode and the other end of the capacitor being grounded.

According to a preferred embodiment of the present invention, when the under-voltage protection voltage received by the control module of the constant-current driver is not greater than the under-voltage protection trigger voltage of the constant-current driver, the constant-current driver stops operating.

According to a preferred embodiment of the present invention, when the under-voltage protection voltage received by the control module of the first constant-current driver of the plurality of constant-current drivers is not greater than the under-voltage protection trigger voltage of the first constant-current driver of the plurality of constant-current drivers, the control module of the first constant-current driver of the plurality of constant-current drivers outputs a low voltage level to the boost converter to make the boosted DC voltage outputted by the boost converter lower than the voltage required by each LED strings to emit light normally so that the plurality of LED strings connected in parallel are turned off together.

According to a preferred embodiment of the present invention, when the under-voltage protection voltage received by the control module of the first constant-current driver of the plurality of constant-current drivers is greater than the under-voltage protection trigger voltage of the first constant-current driver of the plurality of constant-current drivers, the control module of the first constant-current driver of the plurality of constant-current drivers outputs a high voltage level to the boost converter to make the boosted DC voltage outputted by the boost converter satisfying the voltage required by each LED strings to emit light normally so that the plurality of LED strings connected in parallel are turned on together.

According to a preferred embodiment of the present invention, the under-voltage protection voltage outputted to the first constant-current driver of the plurality of constant-current drivers is smaller than the under-voltage protection voltage outputted to the constant-current drivers other than the first constant-current driver of the plurality of constant-current drivers by 0.5-0.7V.

The LED backlight source and the liquid crystal display device of the present invention can make a plurality of LED strings connected in parallel to turn on or off at the same time so as to improve the optical quality of the LED backlight source and the liquid crystal display device.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
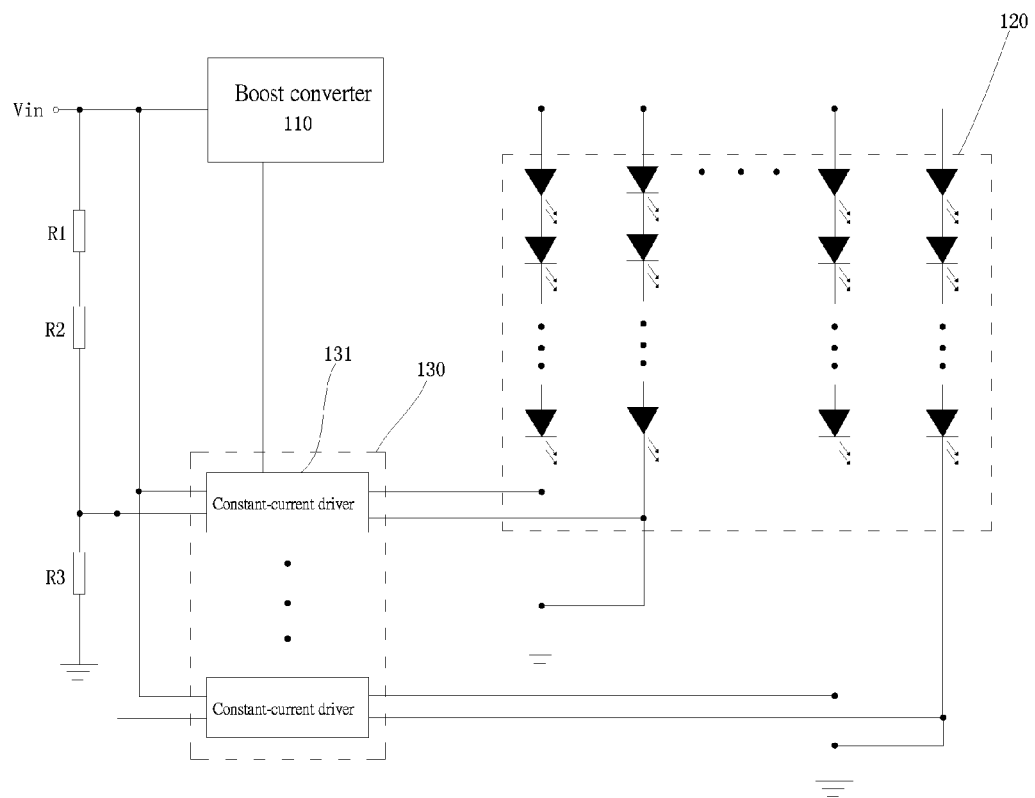
FIG. 1 is a schematic view showing the LED backlight source of a known liquid crystal display device.

The following describes the embodiments of the present invention in details. The embodiments are depicted in the drawings, wherein the same number indicates the same part. The following refers to the drawings and embodiments for detailed description of the present invention. In the following, to prevent the unnecessary details of commonly known structures and/or functions from cluttering the concept of the present invention, the details of commonly known structures and/or functions are omitted.

Figure 2:
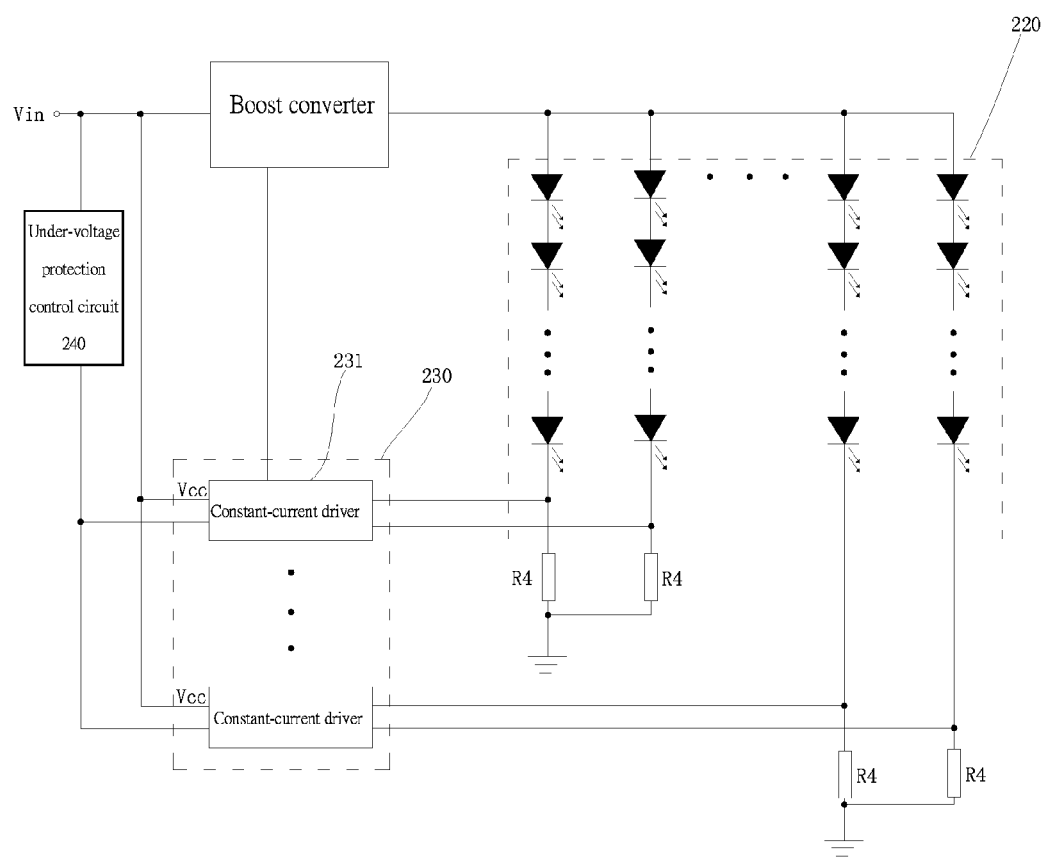
FIG. 2 is a schematic view showing the LED backlight source of liquid crystal display device according to the present invention.

FIG. 2 is a schematic view showing the LED backlight source of liquid crystal display device according to the present invention.

According to the present invention, the embodiment of the LED backlight source of liquid crystal display device is usually disposed opposite to the liquid crystal display panel. The LED backlight source provides display light source to the liquid crystal display panel so that the liquid crystal display panel can display images. As shown in FIG. 2, the LED backlight source comprises a boost converter 210, a plurality of LED strings 220 connected in parallel, a plurality of constant-current drivers 230 connected in parallel and an under-voltage protection control circuit 240.

The boost converter 210 is for boosting the input DC voltage Vin and outputting boosted DC voltage.

The plurality of LED strings 220 is for providing display light source to the liquid crystal display panel. Each LED string comprises a plurality of LEDs and a resistor R4, all strung in series. The plurality of LED strings 220 receives boosted DC voltage from the boost converter 210.

The number of the LEDs in each LED string 220 is N (N is an integer and N>0) can be determined by the following:

$$N \times Vd \leq Vs$$

Wherein Vd is the light-emitting voltage of each LED and Vs is the output voltage of the boost converter 210.

For example, when Vd is 6.5V, Vs=48V, the N is determined to be less than or equal to 7 (N≤7).

Optionally, the resistor R4 can be omitted from the LED string.

The plurality of constant-current drivers 230 is for controlling the current size of each LED string 220, wherein each constant-current driver 230 independently controls currents of two LED strings. Also, the first constant-current driver 231 controls the connection/disconnection of the boost converter 210. It should be noted that, in actual application, each constant-current driver is often integrated onto a chip to form constant-current driver IC chip. Therefore, the number of LED strings connected and controlled by each constant-current driver is determined by the number of channels for connecting LED strings on the constant-current driver IC chip. In the present invention, the number is not restricted by the embodiment in FIG. 2.

The under-voltage protection control circuit 240 outputs an under-voltage protection voltage to each constant-current driver, and each constant-current driver determines whether to stop operating based on the received under-voltage protection voltage, wherein the under-voltage protection voltage outputted to the first constant-current driver 231 must be less than the under-voltage protection voltage outputted to the constant-current drivers other than the first constant-current driver 231.

Figure 3:
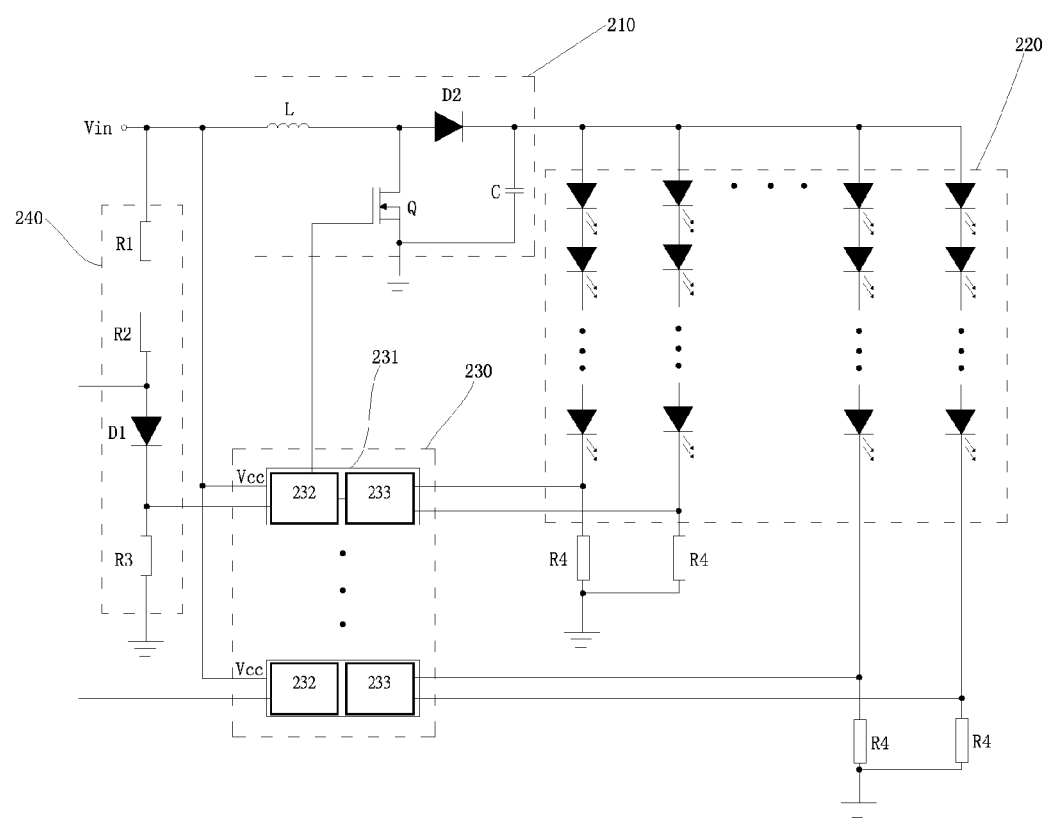
FIG. 3 is a schematic view showing the boost converter, under-voltage protection control circuit and constant-current driver of the LED backlight source according to the present invention.

FIG. 3 is a schematic view showing the boost converter, under-voltage protection control circuit and constant-current driver of the LED backlight source according to the present invention.

As shown in FIG. 3, each constant-current driver of the LED backlight source of the present embodiment comprises: a control module 232 and a detection module 233.

In each constant-current driver, the control module 232 determines whether to stop operating based on the received under-voltage protection voltage outputted by the under-voltage protection control circuit 240, wherein the control module 232 of the first constant-current driver 231 further controls the connection/disconnection of the boost converter 210. The detection module 233 detects the voltage over the two ends of the fourth resistor R4 connected in series with any LED string (i.e., the voltage at the negative terminal of any LED string), and controls the current of any LED string based on the feedback of the voltage over the two ends of the fourth resistor R4. In addition, in actual application, the constant-current driver is often integrated onto a chip to form constant-current driver IC chip, which can only operate when supplied with voltage. Therefore, in the instant embodiment, each constant-current driver comprises an activation voltage terminal Vcc for receiving input DC voltage Vin to activate the constant-current driver.

According to an embodiment of the present invention, the boost converter 210 comprises: an inductor L, an MOS transistor Q, a crystal diode D2 and a capacitor C.

One end of the inductor L is for receiving input DC voltage Vin, and the other end is connected to the positive terminal of the crystal diode D2, while the negative terminal of the crystal diode D2 is connected to the positive terminals of each of the plurality of LED strings. The drain of the MOS transistor Q is connected to the positive terminal of the crystal diode D2, the source of the MOS transistor Q is ground, and the gate of the MOS transistor Q is connected to the first constant-current driver 231. One end of the capacitor C is connected to the negative terminal of the crystal diode D2 and the other end of the capacitor C is grounded.

By outputting signals of different voltage levels to the gate of the MOS transistor Q, the first constant-current driver 231 controls the boost converter 210 to supply boosted DC voltage to each LED string. For example, when the first constant-current driver 231 outputs a low voltage level signal to the gate of the MOS transistor Q, the MOS transistor Q is shutdown, the inductor L stores energy, the boost converter 210 stops supplying boosted DC voltage to each LED string, and a plurality of LED strings are turned off. On the other hand, when the first constant-current driver 231 outputs a high voltage level signal to the gate of the MOS transistor Q, the MOS transistor Q is conductive, the inductor L releases energy, the boost converter 210 supplies boosted DC voltage to each LED string, and a plurality of LED strings are turned on.

According to an embodiment of the present invention, the under-voltage protection control circuit of the LED backlight source comprises: a resistor R1, a resistor R2, a crystal diode D1 and a resistor R3.

One end of the resistor R1 is for receiving input DC voltage Vin and the other end is connected to one end of the resistor R2, while the other end of the resistor R2 is connected to positive terminal of the crystal diode D1 and connected respectively to the constant-current drivers other than the first constant-current driver 231 of the plurality of constant-current drivers. The negative terminal of the crystal diode D1 is connected to one end of the resistor R3 and connected to the first constant-current driver 231, and the other end of the resistor R3 is grounded.

In actual manufacturing, the under-voltage protection trigger voltages of constant-current drivers may not be identical, but with an error within a specific range. For example, the difference between the maximum and the minimum of under-voltage protection trigger voltages of constant-current drivers is controlled within 0.5V. By using the under-voltage protection trigger voltage of the first constant-current driver 231 as a reference and setting the resistances of the resistors R1, R2 and R3, the divided voltages over the resistor R3 after the input DC voltage Vin passing the resistors R1, R2 and R3 becomes the under-voltage protection voltage. Because a voltage drop of 0.5-0.7V exists for the crystal diode D1, the under-voltage protection voltage of the first constant-current driver 231 is lower than the under-voltage protection voltages of constant-current drivers other than the first constant-current driver by 0.5-0.7V. In addition, when the under-voltage protection voltage of the first constant-current driver 231 is higher than the under-voltage protection voltages of the other constant-current drivers, the voltage drop of the crystal diode D1 is sufficient to guarantee no less than the difference between the under-voltage protection voltage of the first constant-current driver 231 and the under-voltage protection voltages of the other constant-current drivers.

When the input DC voltage Vin drops and the under-voltage protection voltage received by the first constant-current driver 231 is not greater than the under-voltage protection trigger voltage of the first constant-current driver 231, at this point, the under-voltage protection voltages of the other constant-current drivers are greater than the under-voltage protection trigger voltages of the other constant-current drivers, only the first constant-current driver 231 activates the under-voltage protection function and stops outputting high level voltage to the gate of the MIS transistor of the boost converter 210 so that the output DC voltage of the boost converter 210 drops and becomes lower than the voltages required by each LED string to emit light normally. As such, the plurality of LED strings 220 is turned off together.

When the input DC voltage Vin increases and the under-voltage protection voltages received by the other constant-current drivers are greater than the under-voltage protection trigger voltages of the other constant-current drivers, at this point, the under-voltage protection voltage of the first constant-current driver 231 is still no greater than the under-voltage protection trigger voltage of the first constant-current driver 231. As such, the output DC voltage from the boost converter 210 is lower than the voltages required by each LED string to emit normally, and thus each LED string is unable to emit light. Only when under-voltage protection voltage of the first constant-current driver 231 is greater than the under-voltage protection trigger voltage of the first constant-current driver 231, the first constant-current driver 231 outputs high level voltage to the gate of the MIS transistor of the boost converter 210 so that the output DC voltage of the boost converter 210 becomes greater than or equal to the voltages required by each LED string to emit light normally. As such, the plurality of LED strings 220 is turned on together.

In the instant embodiment, the crystal diode D1 is only a preferred embodiment of the step-down unit. However, other embodiment of step-down unit can also be used.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. An LED backlight source of liquid crystal display device, which comprises:
    a boost converter, for boosting the input DC voltage and outputting boosted DC voltage;
    a plurality of LED strings connected in parallel, each LED string comprising a plurality of LEDs strung in series and receiving the boosted DC voltage from the boost converter, in each of the plurality of LED strings, the plurality of LEDs strung in series being further connected to a fourth resistor in series;
    a plurality of constant-current drivers, for controlling the size of the current of each of the plurality of LED strings, each constant-current driver controlling the size of the current of at least an LED string and the first constant-current driver controlling the connection and/or disconnection of the boost converter;
    an under-voltage protection control circuit, for outputting under-voltage protection voltage to each of the constant-current drivers and each of the constant-current drivers determining whether to stop operating based on received under-voltage protection voltage, the under-voltage protection voltage outputted to the first constant-current driver being less than the under-voltage protection voltages outputted to the constant-current drivers other than the first constant-current driver of the plurality of constant-current drivers; wherein
    the constant-current driver further comprises a control module, for determining whether to stop operating based on the received under-voltage protection voltage outputted by the under-voltage protection control circuit, the control module of the first constant-current driver further controlling the connection and/or disconnection of the boost converter; and a detection module, for detecting the voltage over the two ends of the fourth resistor connected in series with any LED string of the plurality of LED strings controlled by the constant-current driver, and controlling the current of any LED string of the plurality of LED strings based on the feedback of the voltage over the two ends of the fourth resistor.

2. The LED backlight source of liquid crystal display device as claimed in claim 1, wherein the under-voltage protection control circuit comprises: a first resistor, a second resistor, a step-down unit and a third resistor;
    wherein one end of the first resistor for receiving input DC voltage and the other end connected to one end of the second resistor; the other end of the second resistor connected to one end of the step-down unit and connected respectively to the control modules of the constant-current drivers other than the first constant-current driver of the plurality of constant-current drivers; the other end of the step-down unit connected to one end of the third resistor and connected to the control module of the first constant-current driver of the plurality of constant-current drivers; and the other end of the third resistor being grounded.

3. The LED backlight source of liquid crystal display device as claimed in claim 2, wherein the step-down unit is a first crystal diode, the one end of the step-down unit is the positive terminal of the first crystal diode, and the other end of the step-down unit is the negative terminal of the first crystal diode.

4. The LED backlight source of liquid crystal display device as claimed in claim 3, wherein the boost converter comprises: an inductor, a MOS transistor, a second crystal diode and a capacitor;
    wherein one end of the inductor for receiving input DC voltage, and the other end connected to the positive terminal of the second crystal diode; the negative terminal of the second crystal diode connected to the positive terminals of each of the plurality of LED strings; the drain of the MOS transistor connected to the positive terminal of the second crystal diode, the source of the MOS transistor being ground, the gate of the MOS transistor connected to the control module of the first constant-current driver of the plurality of the constant-current drivers; one end of the capacitor connected to the negative terminal of the second crystal diode and the other end of the capacitor being grounded.

5. The LED backlight source of liquid crystal display device as claimed in claim 2, wherein the boost converter comprises: an inductor, a MOS transistor, a second crystal diode and a capacitor;
    wherein one end of the inductor for receiving input DC voltage, and the other end connected to the positive terminal of the second crystal diode; the negative terminal of the second crystal diode connected to the positive terminals of each of the plurality of LED strings; the drain of the MOS transistor connected to the positive terminal of the second crystal diode, the source of the MOS transistor being ground, the gate of the MOS transistor connected to the control module of the first constant-current driver of the plurality of the constant-current drivers; one end of the capacitor connected to the negative terminal of the second crystal diode and the other end of the capacitor being grounded.

6. The LED backlight source of liquid crystal display device as claimed in claim 5, wherein when the under-voltage protection voltage received by the control module of the constant-current driver is not greater than the under-voltage protection trigger voltage of the constant-current driver, the constant-current driver stops operating.

7. The LED backlight source of liquid crystal display device as claimed in claim 6, wherein when the under-voltage protection voltage received by the control module of the first constant-current driver of the plurality of constant-current drivers is greater than the under-voltage protection trigger voltage of the first constant-current driver of the plurality of constant-current drivers, the control module of the first constant-current driver of the plurality of constant-current drivers outputs a high voltage level to the boost converter to make the boosted DC voltage outputted by the boost converter satisfying the voltage required by each LED strings to emit light normally so that the plurality of LED strings connected in parallel are turned on together.

8. The LED backlight source of liquid crystal display device as claimed in claim 1, wherein the under-voltage protection voltage outputted to the first constant-current driver of the plurality of constant-current drivers is smaller than the under-voltage protection voltage outputted to the constant-current drivers other than the first constant-current driver of the plurality of constant-current drivers by 0.5-0.7V.

9. A liquid crystal display device, which comprises: an LED backlight source and a liquid crystal display panel disposed opposite to the LED backlight source, the LED backlight source providing display light source to the liquid crystal display panel for the liquid crystal panel to display images, wherein the LED backlight source further comprising:
a boost converter, for boosting the input DC voltage and outputting boosted DC voltage;
a plurality of LED strings connected in parallel, each LED string comprising a plurality of LEDs strung in series and receiving the boosted DC voltage from the boost converter, in each of the plurality of LED strings, the plurality of LEDs strung in series being further connected to a fourth resistor in series;
a plurality of constant-current drivers, for controlling the size of the current of each of the plurality of LED strings, each constant-current driver controlling the size of the current of at least an LED string and the first constant-current driver controlling the connection and/or disconnection of the boost converter;
an under-voltage protection control circuit, for outputting under-voltage protection voltage to each of the constant-current drivers and each of the constant-current drivers determining whether to stop operating based on received under-voltage protection voltage, the under-voltage protection voltage outputted to the first constant-current driver being less than the under-voltage protection voltages outputted to the constant-current drivers other than the first constant-current driver of the plurality of constant-current drivers; wherein
the constant-current driver further comprises a control module, for determining whether to stop operating based on the received under-voltage protection voltage outputted by the under-voltage protection control circuit, the control module of the first constant-current driver further controlling the connection and/or disconnection of the boost converter; and a detection module, for detecting the voltage over the two ends of the fourth resistor connected in series with any LED string of the plurality of LED strings controlled by the constant-current driver, and controlling the current of any LED string of the plurality of LED strings based on the feedback of the voltage over the two ends of the fourth resistor.

10. The liquid crystal display device as claimed in claim 9, wherein the under-voltage protection control circuit comprises: a first resistor, a second resistor, a step-down unit and a third resistor;
wherein one end of the first resistor for receiving input DC voltage and the other end connected to one end of the second resistor; the other end of the second resistor connected to one end of the step-down unit and connected respectively to the control modules of the constant-current drivers other than the first constant-current driver of the plurality of constant-current drivers; the other end of the step-down unit connected to one end of the third resistor and connected to the control module of the first constant-current driver of the plurality of constant-current drivers; and the other end of the third resistor being grounded.

11. The liquid crystal display device as claimed in claim 10, wherein the step-down unit is a first crystal diode, the one end of the step-down unit is the positive terminal of the first crystal diode, and the other end of the step-down unit is the negative terminal of the first crystal diode.

12. The liquid crystal display device as claimed in claim 11, wherein the boost converter comprises: an inductor, a MOS transistor, a second crystal diode and a capacitor;
wherein one end of the inductor for receiving input DC voltage, and the other end connected to the positive terminal of the second crystal diode; the negative terminal of the second crystal diode connected to the positive terminals of each of the plurality of LED strings; the drain of the MOS transistor connected to the positive terminal of the second crystal diode, the source of the MOS transistor being ground, the gate of the MOS transistor connected to the control module of the first constant-current driver of the plurality of the constant-current drivers; one end of the capacitor connected to the negative terminal of the second crystal diode and the other end of the capacitor being grounded.

13. The liquid crystal display device as claimed in claim 10, wherein the boost converter comprises: an inductor, a MOS transistor, a second crystal diode and a capacitor;
wherein one end of the inductor for receiving input DC voltage, and the other end connected to the positive terminal of the second crystal diode; the negative terminal of the second crystal diode connected to the positive terminals of each of the plurality of LED strings; the drain of the MOS transistor connected to the positive terminal of the second crystal diode, the source of the MOS transistor being ground, the gate of the MOS transistor connected to the control module of the first constant-current driver of the plurality of the constant-current drivers; one end of the capacitor connected to the negative terminal of the second crystal diode and the other end of the capacitor being grounded.

14. The liquid crystal display device as claimed in claim 13, wherein when the under-voltage protection voltage received by the control module of the constant-current driver is not greater than the under-voltage protection trigger voltage of the constant-current driver, the constant-current driver stops operating.

15. The liquid crystal display device as claimed in claim 14, wherein when the under-voltage protection voltage received by the control module of the first constant-current driver of the plurality of constant-current drivers is greater than the under-voltage protection trigger voltage of the first constant-current driver of the plurality of constant-current drivers, the control module of the first constant-current driver of the plurality of constant-current drivers outputs a high voltage level to the boost converter to make the boosted DC voltage outputted by the boost converter satisfying the voltage required by each LED strings to emit light normally so that the plurality of LED strings connected in parallel are turned on together.

16. The liquid crystal display device as claimed in claim 9, wherein the under-voltage protection voltage outputted to the first constant-current driver of the plurality of constant-current drivers is smaller than the under-voltage protection voltage outputted to the constant-current drivers other than the first constant-current driver of the plurality of constant-current drivers by 0.5-0.7V.

* * * * *